US009135416B2

(12) United States Patent
Barkai et al.

(10) Patent No.: US 9,135,416 B2
(45) Date of Patent: Sep. 15, 2015

(54) GUI-BASED AUTHENTICATION FOR A COMPUTING SYSTEM

(71) Applicant: International Business Machines Corporation, Armonk, NY (US)

(72) Inventors: Gilad Barkai, Haifa (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/775,274

(22) Filed: Feb. 25, 2013

(65) Prior Publication Data

US 2014/0245431 A1    Aug. 28, 2014

(51) Int. Cl.
*G06F 21/31* (2013.01)

(52) U.S. Cl.
CPC ........ *G06F 21/31* (2013.01); *G06F 2221/2103* (2013.01)

(58) Field of Classification Search
CPC ................................. G06F 21/30; G06F 21/31
USPC .......................................................... 726/19
See application file for complete search history.

(56) References Cited

U.S. PATENT DOCUMENTS

| 8,086,745 | B2 | 12/2011 | Liew et al. |
| 8,117,458 | B2 * | 2/2012 | Osborn et al. ................ 713/183 |
| 8,174,503 | B2 | 5/2012 | Chin |
| 8,306,504 | B1 * | 11/2012 | Rincker et al. ................ 455/411 |
| 8,392,975 | B1 * | 3/2013 | Raghunath ........................ 726/7 |
| 8,413,220 | B1 * | 4/2013 | Quinn et al. ...................... 726/5 |
| 8,638,939 | B1 * | 1/2014 | Casey et al. ................... 380/277 |
| 2004/0230843 | A1 * | 11/2004 | Jansen ........................... 713/202 |
| 2004/0260955 | A1 * | 12/2004 | Mantyla ........................ 713/202 |
| 2005/0060554 | A1 | 3/2005 | O'Donoghue |

(Continued)

OTHER PUBLICATIONS

Maeder, A., Gaze Based User Authentication for Personal Computer Applications, Oct. 2004, Proceedings of 2004 International Symposium on Intelligent Multimedia, Video and Speech Processing, pp. 727-730.*

(Continued)

*Primary Examiner* — Kenneth Chang
(74) *Attorney, Agent, or Firm* — David M. Quinn; Jason H. Sosa

(57) ABSTRACT

Machines, systems and methods for providing an authentication challenge are provided. The method comprises analyzing data stored in a computing system equipped with a graphical user interface (GUI), wherein the data stored is related to identity and relationships among items that have a profile; and based on the analysis, issuing a challenge to authenticate access to one or more content or services available by way of the computing system, in response to a user interaction with the computing system, wherein the response to the challenge is known to a user who has personal knowledge of the identity and relationships among the items with a profile, and wherein the user successfully authenticates against the challenge by interacting with visual presentations of the items by placing the items in an order that indicates a correct relationship between at least two or more of the items.

20 Claims, 7 Drawing Sheets

(56) References Cited

U.S. PATENT DOCUMENTS

| | | | |
|---|---|---|---|
| 2008/0147639 A1* | 6/2008 | Hartman et al. | 707/5 |
| 2009/0038006 A1* | 2/2009 | Traenkenschuh et al. | 726/21 |
| 2010/0058437 A1* | 3/2010 | Liew et al. | 726/2 |
| 2010/0095371 A1 | 4/2010 | Rubin | |
| 2010/0120396 A1* | 5/2010 | Faith et al. | 455/410 |
| 2010/0153284 A1* | 6/2010 | Hoag et al. | 705/319 |
| 2010/0180336 A1* | 7/2010 | Jones et al. | 726/19 |
| 2011/0029934 A1* | 2/2011 | Locker et al. | 715/863 |
| 2011/0231407 A1* | 9/2011 | Gupta et al. | 707/748 |
| 2011/0300831 A1 | 12/2011 | Chin | |
| 2012/0054057 A1 | 3/2012 | O'Connell et al. | |
| 2013/0036461 A1 | 2/2013 | Lowry | |
| 2014/0059672 A1* | 2/2014 | Natividad | 726/18 |

OTHER PUBLICATIONS

Confident Technologies, "Confident mobile authentication", Confident Technologies. URL: http://www.confidenttechnologies.com/files/Confident_Mobile_Authentication_Data_Sheet_0.pdf, downloaded Feb. 20, 2013.

Angulo et al., "Exploring touch-screen biometrics for user identification on smart phones", Karlstad University, p. 9, 2011.

Confident Technologies, "Confident mobile authentication", Confident Technologies. URL: http://www.confidenttechnologies.com/files/Confident_Mobile_Authentication_Data_Sheet.0.pdf, downloaded Feb. 20, 2013.

* cited by examiner

GUI-BASED AUTHENTICATION FOR A COMPUTING SYSTEM

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to challenge-base authentication and, more particularly, to a system and method for authenticating access to a computing system using a graphical user interface (GUI).

BACKGROUND

Most users of a computing device have the option of using personal passwords to limit access to the content stored in the computing device. This generally requires the user to type in the password into a provided text window. For computing devices that are equipped with a touch screen, a user can use a pattern or combination of key entries as a passkey.

In general, it is suggested that a user should change the password or the passkey every so often as a safety measure. This may be inconvenient to a user, because each time the user will have to come up with a new password or passkey. The user will have to further memorize the new passkey or save it in a safe location to refer to it later. Most users would like to have a more convenient way of securing their computing device.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, Machines, systems and methods for providing an authentication challenge are provided. The method comprises analyzing data stored in a computing system equipped with a graphical user interface (GUI), wherein the data stored is related to identity and relationships among items that have a profile; and based on the analysis, issuing a challenge to authenticate access to one or more content or services available by way of the computing system, in response to a user interaction with the computing system, wherein the response to the challenge is known to a user who has personal knowledge of the identity and relationships among the items with a profile, and wherein the user successfully authenticates against the challenge by interacting with visual presentations of the items by placing the items in an order that indicates a correct relationship between at least two or more of the items.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
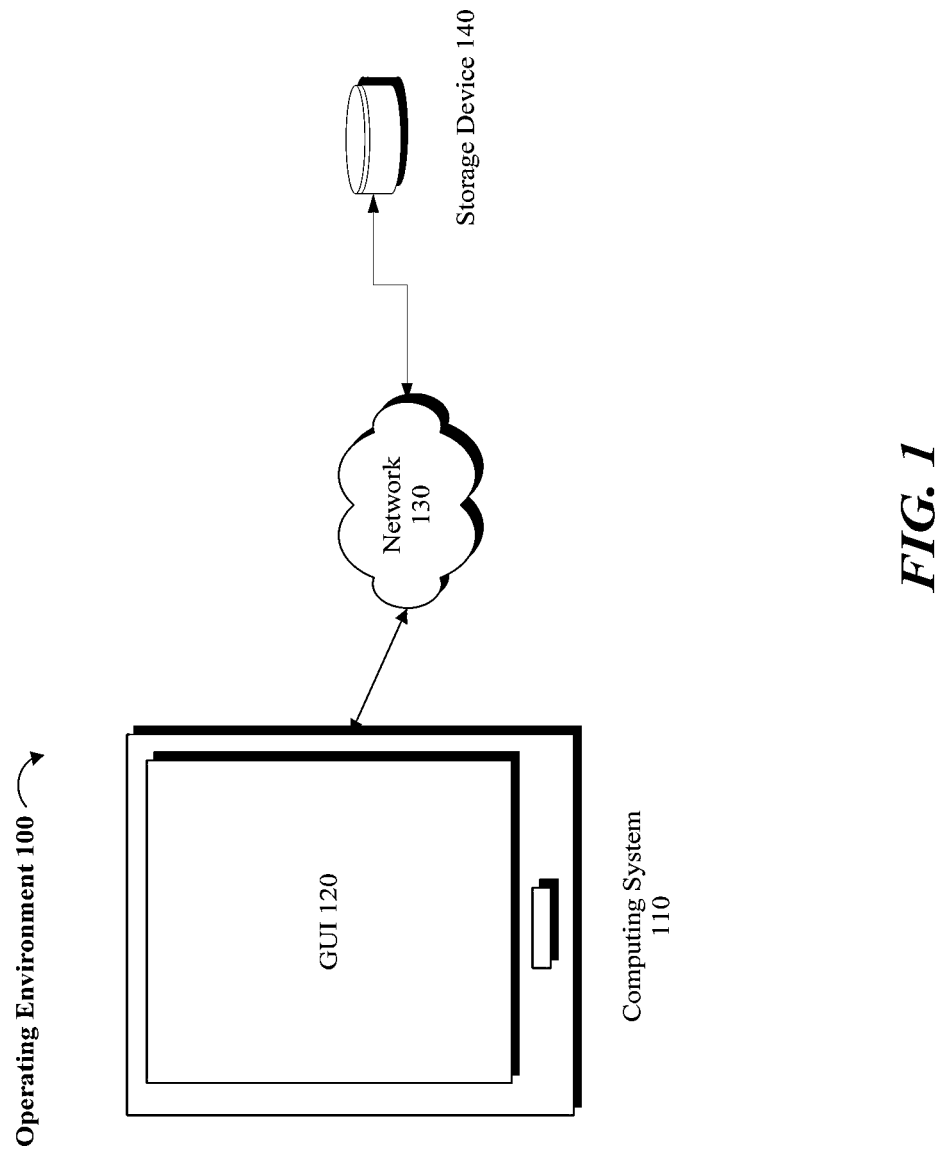
FIG. 1 illustrates an exemplary operating environment in accordance with one or more embodiments, wherein a computing system having a graphical user interface (GUI) is secured based on personal information of other individuals known to a user.

Referring to FIG. 1, an exemplary operating environment 100 is illustrated in which a computing system 110 is equipped with a graphical user interface (GUI) 120 that is rendered on a display associated with the computing system 110. Computing system 110 maybe a personal computer, a mobile communication device (e.g., a smart phone), a tablet device (e.g., an iPad) or any other type of device that may be used to access or store personal information about one or more individuals.

It is noteworthy that the personal information may be known to the user of computing system 110 and stored on an internal storage device (not shown) embedded in the computing system 110 or on a storage device 140 external to the computing system 110 in the course of adding contact information for one or more people into a contact database, for example. The external storage device 140 may be accessible over a communication means such as a communications network 130 (e.g., the Internet) or over a short distance communication protocol (e.g., Bluetooth), over a wire, or over any other suitable means.

In accordance with one embodiment, the personal information may be stored in the database that may be used to organize the personal information in a manner such that the information may be accessed by way of authentication software to create a challenge for a user who is trying to access content via computing system 110. The personal information may include information about the user's friends, relatives, colleagues and other people known to the user. Optionally, a relationship may exist between the individuals whose personal information is stored in the database, where this relationship is known to the user, for example.

In one implementation, the known relationships among said individuals is recorded in the database, such that entries in the database associated with said individuals reflect the relationships that are known to the user. For example, if the personal information for the user's parents is recorded in the database, then the entries associated with the user's parents may include a tag (e.g., an identifier) indicating "mom" or "dad" as appropriate. In a similar manner, other entries may include tags that define individuals that fall in other categories, such as "friends", "colleagues", "first cousins", etc.

In an example embodiment, computing system 110 is equipped with a communication port for communicating over a communication channel, such as a phone line to make a call, or a data line to send a message. If personal information recorded in the database includes contact information (e.g., phone number, email address, etc.) then metadata associated with one or more communication events (e.g., phone calls made, emails or text messages sent, etc.) may be logged and stored in a format such that said metadata is available for future analysis and may be used to generate a challenge for the purpose of authentication.

Figure 2:
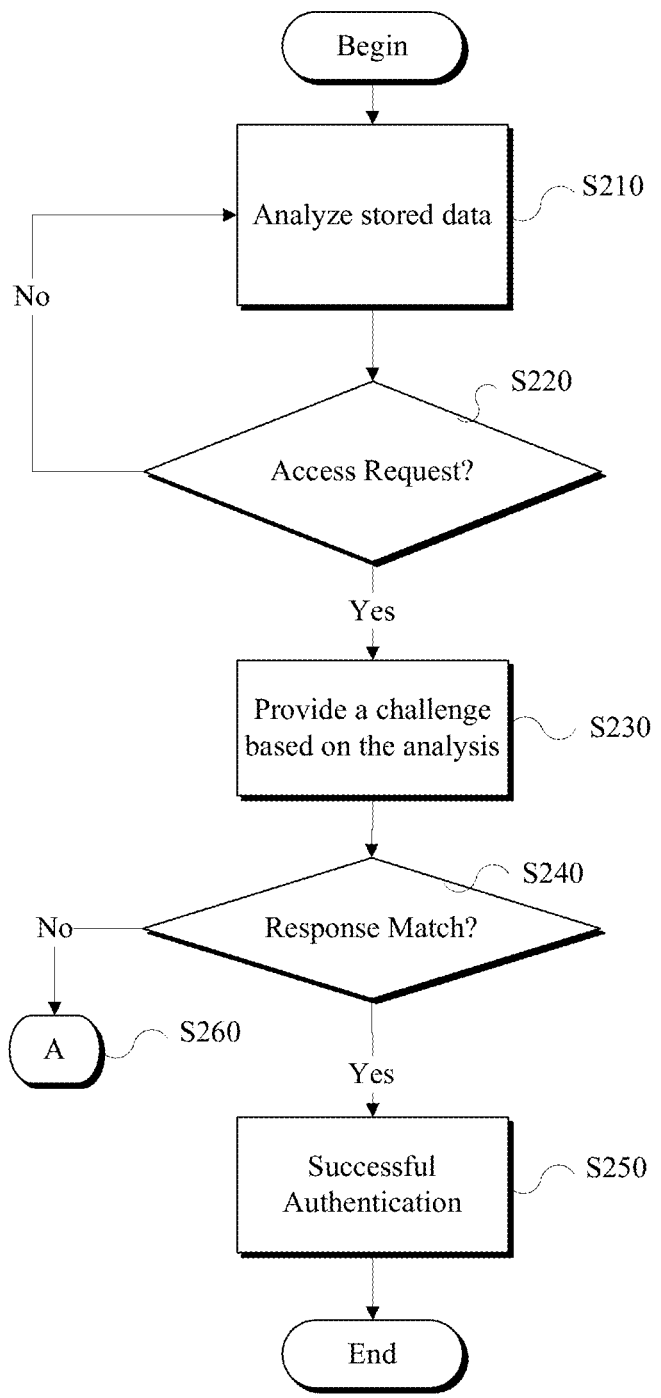
FIG. 2 is an exemplary flow diagram of a method of authenticating a challenge created based on personal information of other individuals known to a user, in accordance with one embodiment.

Referring to FIG. 2, authentication software may be implemented to create an authentication challenge the answer to which is known to a user by the virtue of the user's knowledge of the personal information stored in the database or his general knowledge of the logged history of communication events. In one embodiment, the authentication software may be utilized to analyze data stored in the database or the event log to determine, for example, relationships between the individuals whose contact information is stored in the database or relationships between the individuals and events logged (S210).

Once an access request is received (S220), in response to a user attempting to access content by way of interacting with the computing system 110, then the authentication software may provide a challenge based on the analysis results, as provided in further detail below (S230). If the user's response to the challenge matches the answer expected, then authentication is successful, otherwise other provisions may be made for the user to try again or access is denied (S240, S250, S260). It is noteworthy that the authentication software may be loaded and executed either fully or partially on computing system 110 to provide authentication services. The data analysis process may be either performed by the authentication software or a separate analysis module depending on implementation.

Figure 3A:
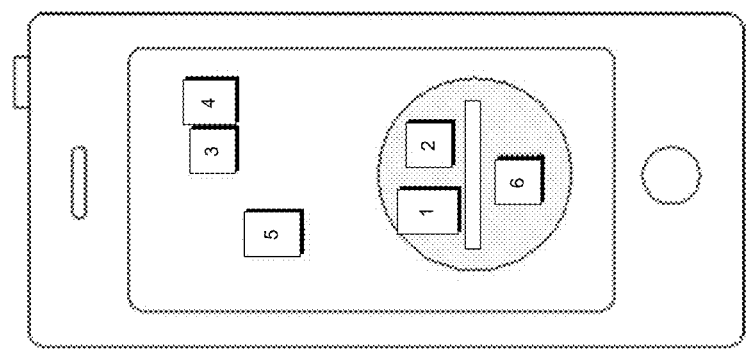
FIGS. 3A through 3C are exemplary implementations of one or more embodiments that may be used to create a challenge in a GUI environment, in accordance with one embodiment.
Figure 3A:
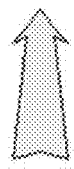
Figure 3A:
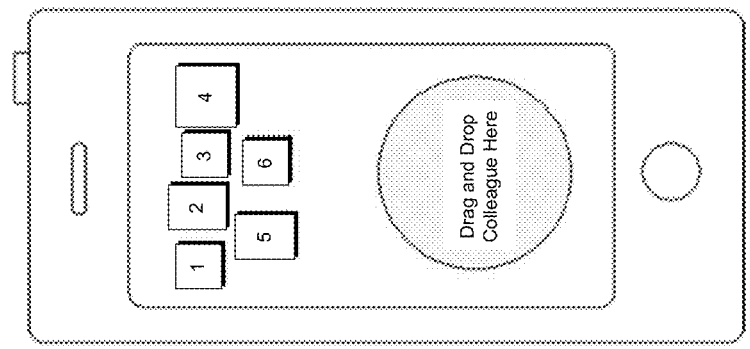

Referring to FIG. 3A, in one example, the personal information stored in the database may include information about relationships of one or more individuals to the user (or to each other). Having access to such information, the authentication software may create a challenge that would render visual presentations (e.g., an icon, a picture, etc.) of a plurality of individuals on a display screen (shown as blocks 1 through 6), with a prompt for the user to identify the individuals that have the same relationship to the user. For example, if the database entries for the individuals include identifiers that indicate certain individuals fall in the category of "colleagues", then the user may be asked to select those visual presentations that are of his colleagues.

As shown in FIG. 3A, the GUI may include, in one implementation, a designated area (shown as a circular area in this example) where the user may drag and drop the visual presentations of those who are his colleagues. The authentication software is desirably implemented such that not all the visual presentations rendered are of the same category. In this manner, the user who has personal knowledge of the individuals' identity is able to correctly solve or respond to the challenge by way of selecting those individuals who fall in the designated category. If an individual who does not belong to the designated category is selected (e.g., dragged into the circular area), then authentication fails. To make the challenge more secure, some visual presentations may be of individuals who are not known to the user (e.g., a picture of an arbitrary person may be displayed in the GUI).

Figure 3B:
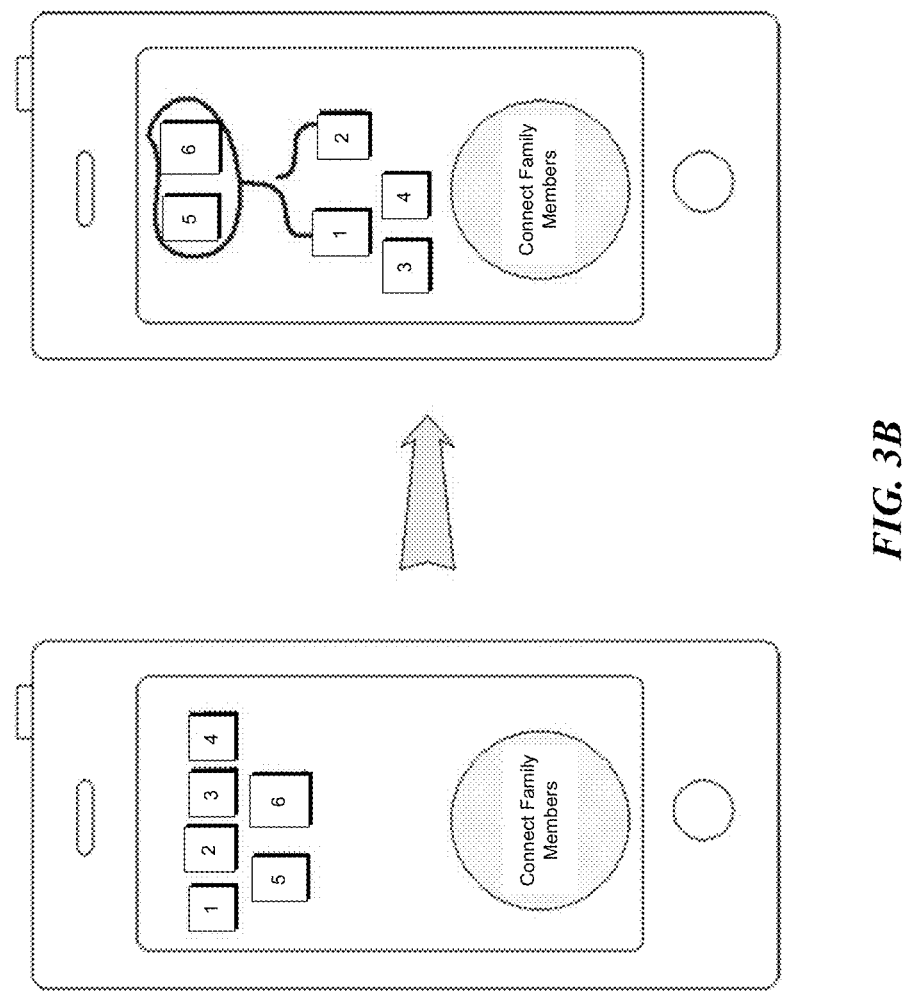

Referring to FIG. 3B, another example implementation is illustrated in which the challenge is generated based on the knowledge of relationships between individuals in the database such that the user is prompted to indicate the nature of the relationship by way of, for example, connecting or grouping the visual presentations of two or more individuals in a certain manner. In the example of FIG. 3B, visual presentations of individuals who are family members and non-family members are displayed. If the user groups the individuals that belong to the same family together, then authentication is successful.

As shown in FIG. 3B, the circular pattern drawn around two visual presentations of individuals on the top may indicate that the two individuals are husband and wife, for example. The lines connecting the presentation of husband and wife to the visual presentations of the two individuals directly below may indicate that the husband and wife have two children (e.g., a son and a daughter), for example, wherein the linear connection is interpreted by the authentication software as a parent child relationship and an enclosing circular pattern is interpreted by the authentication software as a spousal relationship. If the user properly groups the individuals based on the known relationships, then authentication is successful. To make the challenge more secure, some visual presentations may be of individuals who are not known to the user.

Figure 3C:
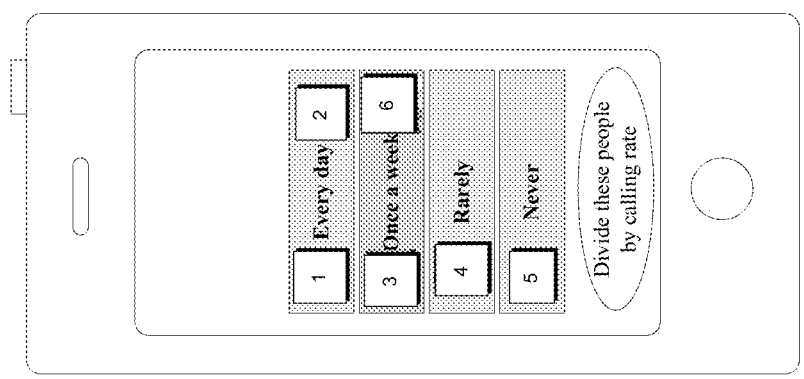
Figure 3C:
Figure 3C:
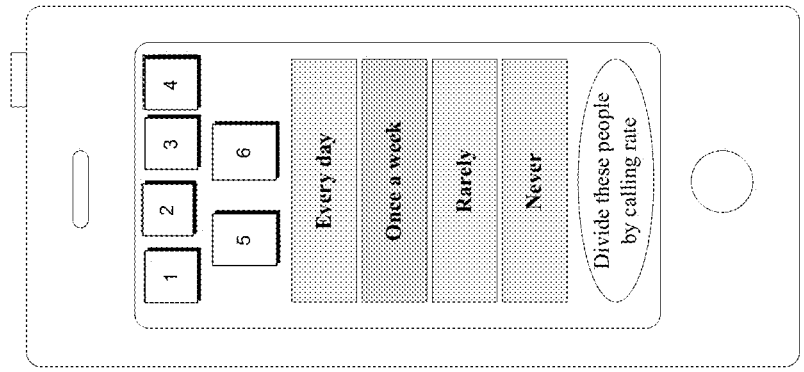

Referring to FIG. 3C, in another example implementation, a user may be provided with a challenge to group visual presentations of the individuals in a particular order based on, for example, the frequency with which the user communicates with said individuals (e.g., by way of a phone call, an email, or text messaging). For example, a challenge may be implemented to ask the user to group the visual presentations of the individuals with which the user communicates on a daily basis in one area, those with which the user communicates on a weekly basis in another area, and so on. To make the challenge more secure, some visual presentations may be of individuals who are not known to the user.

In the above example, if the user correctly ranks the individuals based on the call frequency known to him, then the response is verified against event data (e.g., data or metadata stored that may be analyzed to track and determine communication frequency among the individuals that have a record in the database). If the user's response matches the expected answer then authentication software may be configured to allow some flexibility (e.g., rate of error) in interpreting a user's responses, so that if the user's response is accurate above a certain threshold level then authentication is not overtly rejected and is either approved or the user is provided with another challenge.

It should be noted that the above example embodiments are provided to support the general concepts and ideas disclose here in a non-limiting manner. That is, the particular embodiments are not to be construed as limiting the scope of the claimed subject matter to the particular embodiments disclosed in the examples above. In other embodiments, the personal information and relationship data stored in the database in addition to event data logged may be utilized to generate challenges that would provide a user with visual presentations that test his personal knowledge of certain relationships and events.

Since it is expected that the user of the computing system 110 has control over the personal information stored in the database and also the communication events initiated using the computing system 110, it is thus reasonably presumed that the user is personally aware of the particular relationships between the individuals' records and the logged events. As such, the authentication methods disclosed herein would obviate the need for the user to remember arcane passwords and passkeys or the need for the user to have to look up the passwords or passkeys from a possibly unsafe source or inadequately protected source.

Advantageously, a variety of logged events, personal information and relationships recorded in the database may be used to provide different authentication challenges to the user, where such challenges are anything but routine. In other words, a different authentication challenge may be presented to a user each time he attempts to authenticate. This variety may be entertaining to a user and it may also provide additional measures of security because unauthorized users, who are unfamiliar with the individuals whose personal information is stored in the database, will have a difficult time guessing the correct answer.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
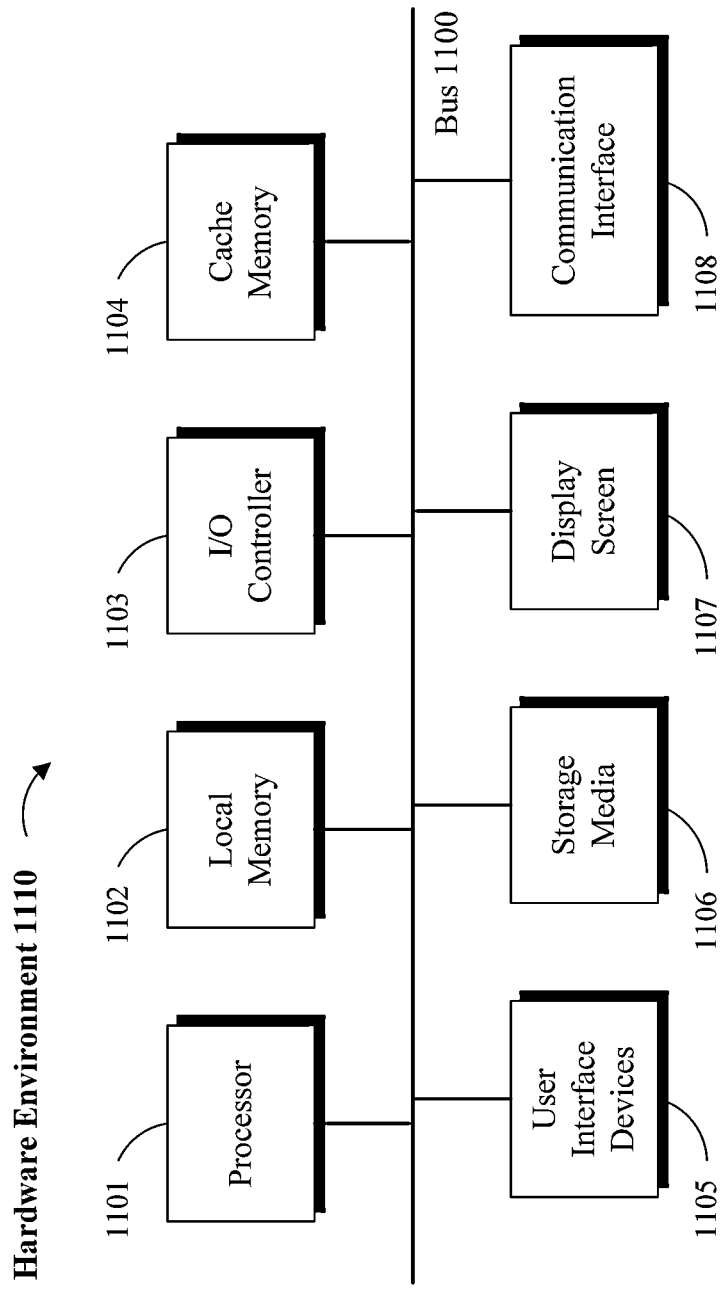
FIGS. 4A and 4B are block diagrams of hardware and software environments in which the disclosed systems and methods may operate, in accordance with one or more embodiments.
Figure 4B:
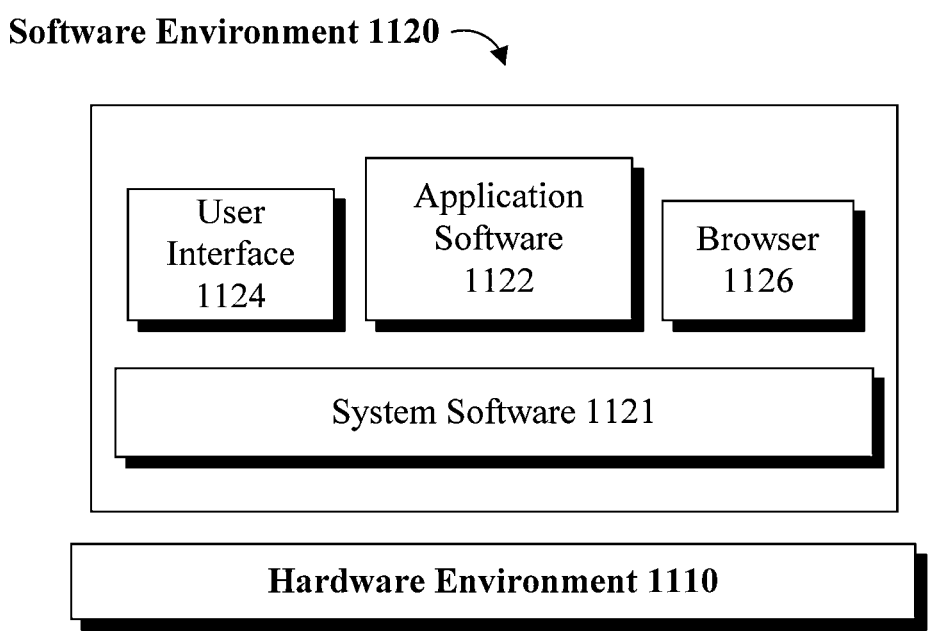

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 1110 may comprise a processor 1101 couple to one or more storage elements by way of a bus system 1100. The storage elements, for example, may comprise local memory 1102, storage media 1106, cache memory 1104 or other machine-usable or computer readable media. Within the context of this disclosure, a machine usable or computer readable storage medium may include any readable article that may be utilized to contain, store, communicate, or transport program code.

A computer readable storage medium may be an electronic, magnetic, optical, electromagnetic, infrared, or semiconductor medium, system, apparatus or device. Examples of a computer readable storage medium may include a semiconductor or solid-state memory, magnetic tape, a removable computer diskette, a random access memory (RAM), a read-only memory (ROM), a rigid magnetic disk, or an optical disk, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for providing an authentication challenge, the method comprising:
   analyzing data stored in a computing system equipped with a graphical user interface (GUI), wherein the data stored indicates identity and relationships among items that have a profile;
   based on the analyzed data, dynamically generating a challenge and a response to the challenge;
   issuing the challenge by displaying a plurality of items, wherein each item corresponds to an acquaintance of a user, wherein the user is familiar with the relationships among the plurality of items, and wherein the challenge and the response are unknown to the user prior to issuing the challenge;
   authenticating access by the user to one or more content or services available by way of the computing system in response to determining that a user interaction with the computing system provides the response, and
   wherein the challenge requires the user to provide the response by arranging visual presentations of the items by placing the items in a particular order that indicates a correct relationship between at least two or more of the items, wherein the particular order includes one or more groups based on a frequency with which the user communicates with the acquaintances.

2. The method of claim 1, wherein the items comprise contacts in a contacts database, and a relationship between two or more of the items is based on a personal relationship.

3. The method of claim 2, wherein the contacts database comprises contact information about individuals known to the user.

4. The method of claim 2, wherein the contacts database comprises profile information about individuals known to the user.

5. The method of claim 1, wherein user interaction with the computing system comprises an interaction with a touch screen display indicating that one or more items belong to a first category.

6. The method of claim 5, wherein the user groups the one or more items by way of dragging and dropping visual presentations of the one or more items displayed into a designated area on the touch screen display.

7. The method of claim 1, wherein user interaction with the computing system comprises interacting with a touch screen display to draw markings that indicate relationships between the visual presentations of the items.

8. The method of claim 1, wherein at least two of the plurality of items belong to the same group.

9. The method of claim 1, wherein the visual presentations of the items includes at least a visual presentation of one item that has no relationship with the other items.

10. The method of claim 1, wherein the computing system is at least one of a mobile communication device, a tablet, or a portable computing device.

11. A system for providing an authentication challenge, the system comprising:
    one or more computer processors;
    one or more computer readable storage devices;
    program instructions stored on the computer readable storage devices for execution by at least one of the one or more processors, the program instructions comprising:
    program instructions to analyze data stored in a computing system equipped with a graphical user interface (GUI), wherein the data stored indicates identity and relationships among items that have a profile; and
    program instructions to, based on the analyzed data, dynamically generate a challenge and a response to the challenge;
    program instructions to issue the challenge by displaying a plurality of items, wherein each item corresponds to an acquaintance of a user, wherein the user is familiar with the relationships among the plurality of items, and wherein the challenge and the response are unknown to the user prior to issuing the challenge;
    program instructions to authenticate access by the user to one or more content or services available by way of the computing system in response to determining that a user interaction with the computing system provides the response, and
    wherein the challenge requires the user to provide the response by arranging visual presentations of the items by placing the items in a particular order that indicates a correct relationship between at least two or more of the items, wherein the particular order includes one or more groups based on a frequency with which the user communicates with the acquaintances.

12. The system of claim 11, wherein the items comprise contacts in a contacts database, and wherein the correct relationship is based on a personal relationship.

13. The system of claim 12, wherein the contacts database comprises contact information about individuals known to the user.

14. The system of claim 12, wherein the contacts database comprises profile information about individuals known to the user.

15. The system of claim 11, wherein user interaction with the computing system comprises an interaction with a touch screen display indicating that one or more items belong to a first category.

16. A computer program product comprising a computer readable storage device having a computer readable program, wherein the computer readable program when executed on a computer causes the computer to:
   analyze data stored in a computing system equipped with a graphical user interface (GUI), wherein the data stored indicates identity and relationships among items that have a profile; and
   based on the analyzed data, dynamically generate a challenge and a response to the challenge;
   issue the challenge by displaying a plurality of items, wherein each item corresponds to an acquaintance of a user, wherein the user is familiar with the relationships among the plurality of items, and wherein the challenge and the response are unknown to the user prior to issuing the challenge;
   authenticate access by the user to one or more content or services available by way of the computing system in response to determining that a user interaction with the computing system provides the response, and
   wherein the challenge requires the user to provide the response by arranging visual presentations of the items by placing the items in a particular order that indicates a correct relationship between at least two or more of the items, wherein the particular order includes one or more groups based on a frequency with which the user communicates with the acquaintances.

17. The computer program product of claim 16, wherein the items comprise contacts in a contacts database, and wherein the correct relationship is based on a personal relationship.

18. The computer program product of claim 17, wherein the contacts database comprises contact information about individuals known to the user.

19. The computer program product of claim 17, wherein the contacts database comprises profile information about individuals known to the user.

20. The computer program product of claim 16, wherein user interaction with the computing system comprises an interaction with a touch screen display indicating that one or more items belong to a first category.

* * * * *